(12) United States Patent
Hartvigsen et al.

(10) Patent No.: US 9,017,437 B2
(45) Date of Patent: Apr. 28, 2015

(54) METHOD FOR FORMING SYNTHESIS GAS USING A PLASMA-CATALYZED FUEL REFORMER

(71) Applicants: Joseph J. Hartvigsen, Kaysville, UT (US); S. Elangovan, South Jordan, UT (US); Piotr Czernichowski, Layton, UT (US); Michele Hollist, South Jordan, UT (US)

(72) Inventors: Joseph J. Hartvigsen, Kaysville, UT (US); S. Elangovan, South Jordan, UT (US); Piotr Czernichowski, Layton, UT (US); Michele Hollist, South Jordan, UT (US)

(73) Assignee: Ceramatec, Inc., Salt Lake City, UT (US)

( * ) Notice: Subject to any disclaimer, the term of this patent is extended or adjusted under 35 U.S.C. 154(b) by 343 days.

(21) Appl. No.: 13/710,731

(22) Filed: Dec. 11, 2012

(65) Prior Publication Data

US 2014/0157669 A1 Jun. 12, 2014

(51) Int. Cl.
*C10J 3/18* (2006.01)
*C01B 3/38* (2006.01)
*C01B 3/36* (2006.01)
*C10G 2/00* (2006.01)

(52) U.S. Cl.
CPC ... *C10J 3/18* (2013.01); *C01B 3/36* (2013.01); *C01B 3/38* (2013.01); *C10G 2/32* (2013.01); *C10J 2300/1238* (2013.01); *C10J 2300/1646* (2013.01); *C10J 2300/1659* (2013.01); *C10J 2300/1662* (2013.01); *C01B 2203/0233* (2013.01); *C01B 2203/025* (2013.01); *C01B 2203/062* (2013.01); *C01B 2203/066* (2013.01); *C01B 2203/0861* (2013.01)

(58) Field of Classification Search
USPC .......................................................... 48/61
See application file for complete search history.

(56) References Cited

U.S. PATENT DOCUMENTS

| | | | |
|---|---|---|---|
| 3,488,226 A | 1/1970 | Baker et al. |
| 3,622,493 A | 11/1971 | Crusco |
| 3,920,417 A | 11/1975 | Fernandez |
| 4,141,694 A | 2/1979 | Camacho |

(Continued)

FOREIGN PATENT DOCUMENTS

| FR | 2758317 | 7/1998 |
| FR | 2768424 | 3/1999 |

(Continued)

OTHER PUBLICATIONS

U.S. Appl. No. 60/798,863, filed May 8, 2006, Hartvigsen et al.

(Continued)

*Primary Examiner* — Matthew Merkling
(74) *Attorney, Agent, or Firm* — David Fonda

(57) ABSTRACT

A method of forming a synthesis gas utilizing a reformer is disclosed. The method utilizes a reformer that includes a plasma zone to receive a pre-heated mixture of reactants and ionize the reactants by applying an electrical potential thereto. A first thermally conductive surface surrounds the plasma zone and is configured to transfer heat from an external heat source into the plasma zone. The reformer further includes a reaction zone to chemically transform the ionized reactants into synthesis gas comprising hydrogen and carbon monoxide. A second thermally conductive surface surrounds the reaction zone and is configured to transfer heat from the external heat source into the reaction zone. The first thermally conductive surface and second thermally conductive surface are both directly exposed to the external heat source. A corresponding apparatus and system are also disclosed herein.

19 Claims, 12 Drawing Sheets

(56) References Cited

U.S. PATENT DOCUMENTS

| | | | |
|---|---|---|---|
| 5,069,987 | A | 12/1991 | Gordon |
| 5,340,664 | A | 8/1994 | Hartvigsen |
| 5,366,819 | A | 11/1994 | Hartvigsen et al. |
| 5,409,784 | A | 4/1995 | Bromberg et al. |
| 5,425,332 | A | 6/1995 | Rabinovich et al. |
| 5,595,833 | A | 1/1997 | Gardner et al. |
| 5,763,114 | A | 6/1998 | Khandkar et al. |
| 5,938,800 | A | 8/1999 | Verrill et al. |
| 5,993,761 | A | 11/1999 | Czernichowski et al. |
| 6,007,742 | A | 12/1999 | Czernichowski et al. |
| 6,153,852 | A | 11/2000 | Blutke et al. |
| 6,185,341 | B1 | 2/2001 | Ishida et al. |
| 6,245,309 | B1 | 6/2001 | Etievant et al. |
| 6,436,354 | B1 | 8/2002 | Priegnitz et al. |
| 6,606,855 | B1 | 8/2003 | Kong et al. |
| 6,924,608 | B2 | 8/2005 | Czernichowski et al. |
| 7,089,745 | B2 | 8/2006 | Roby et al. |
| 7,459,594 | B2 | 12/2008 | Czernichowski et al. |
| 7,588,746 | B1 | 9/2009 | Muradov et al. |
| 7,973,262 | B2 | 7/2011 | Matveev |
| 2003/0024806 | A1 | 2/2003 | Foret |
| 2003/0215374 | A1 | 11/2003 | Wheeldon et al. |
| 2003/0235725 | A1 | 12/2003 | Hatliner et al. |
| 2004/0216378 | A1 | 11/2004 | Smaling |
| 2005/0269978 | A1 | 12/2005 | Czernichowski et al. |
| 2006/0018823 | A1 | 1/2006 | Czernichowski et al. |
| 2006/0154189 | A1 | 7/2006 | Ramotowski |
| 2007/0186474 | A1 | 8/2007 | Rabovitser et al. |
| 2007/0254966 | A1 | 11/2007 | Eskin et al. |
| 2007/0259228 | A1 | 11/2007 | Hartvigsen et al. |
| 2009/0056222 | A1 | 3/2009 | Gutsol et al. |
| 2009/0100752 | A1 | 4/2009 | Sessa et al. |
| 2009/0119994 | A1 | 5/2009 | Johnson et al. |
| 2010/0003556 | A1 | 1/2010 | Hartvigsen et al. |
| 2010/0266908 | A1 | 10/2010 | de Graffenried, Sr. |

FOREIGN PATENT DOCUMENTS

| | | |
|---|---|---|
| FR | 2817444 | 5/2002 |
| FR | 2872149 | 12/2005 |
| FR | 2873306 | 1/2006 |
| WO | WO-9830524 | 7/1998 |
| WO | WO-9919456 | 4/1999 |
| WO | WO-0133056 | 5/2001 |
| WO | WO-0221624 | 3/2002 |
| WO | WO-2004033368 | 4/2004 |
| WO | WO-2004112447 | 12/2004 |
| WO | WO-2011119274 | 9/2011 |

OTHER PUBLICATIONS

Ridley, Basia "International Search Report for PCT/US06/25092", (Jan. 5, 2007),1-2.

Ridley, Basia "Written Opinion of the International Searching Authority for PCT/US06/25092", (Jan. 5, 2007),1-3.

Solola, T. "Office Action for U.S. Appl. No. 11/167,572", (Jul. 26, 2007),1-6.

Solola, T. "Office Action for U.S. Appl. No. 11/167,572 send Jan. 4, 2008", 1-7.

Copenheaver, B. "International Search Report for PCT/US07/11039 sent Feb. 6, 2008",1-2.

Copenheaver, B. "Written Opinion for PCT/US07/11039 sent Feb. 6, 2008",1-7.

Wisegeek (Author Unknown), "What is a Plasma Cutter?", (c) 2006, retrieved from the internet on Nov. 21, 2007. Available at http://web.archive.org/web/20060427222537/http://www.wisegeek.com/what-is-a-plasma-cutter.htm,(Apr. 27, 2006),1-2.

Czernichowski, A. "Glidarc Assisted Preparation of the Synthesis Gas from Natural and Waste Hydrocarbons Gases", *Oil & Gas Science and Technology—Rev. IPF*, vol. 56, No. 2,(2001),181-198.

Park, Hyung Dal "International Search Report", International App. No. PCT/US/2009/053207, (Apr. 1, 2010),1-3.

Park, Hyung Dal "Written Opinion of the International Searching Authority", International App. No. PCT/US/2009/053207, (Apr. 1, 2010),1-3.

Merkling, Matthew J., "Final Office Action", U.S. Appl. No. 11/745942, (Apr. 2, 2012)1-8.

Merkling, Matthew J., "Non Final Office Action", U.S. Appl. No. 11/745,942, (Apr. 21, 2011),1-8.

Cristescu, Ioana "European Search Report", EP App. No. 07776838.0 (Corresponding to U.S. Appl. No. 11/745,942), (Dec. 14, 2011),1-7.

Gallagher, Michael et al., "Partial Oxidation and Autothermal Reforming of Heavy Hydrocarbon Fuels with Non-Equilibrium Gliding Arc Plasma for Fuel Cell Applications", *Thesis* submitted to Drexel University, Phil., PA, (Feb. 1, 2010),1-175.

Raju, Arun et al., "Synthesis Gas Production Using Steam Hydrogasification and Steam Reforming", *Fuel Processing Technology* 90, (2009),330-336.

Van Dyk, J. C., et al., "Syngas Production From South African Coal Sources Using Sasol-Lurgi Gasifiers", *International Journal of Coal Geology* 65, Available online Aug. 11, 2005(2006),243-253.

Strait, Megan et al., "Synthesis Gas Reformers", http://www.owlnet.rice.edu/~ceng403/nh3ref97.html , Rice University, (1997),1-6.

Czernichowski, et al., "English Language Abstract", FR 2758317, (Jul. 17, 1998),1-2.

Czernichowski, et al., "English Language Abstract", FR 2768424, (Mar. 19, 1999),1.

Czernichowski, et al., "English Language Abstract", FR 2817444, (May 31, 2002),1.

Czernichowski, et al., "English Language Abstract", FR 2872149 and FR 04007054, (Dec. 30, 2005),1.

Lewis, Stan "Search Report", *National Patent Services Search Report*, Arlington VA, (Jan. 4, 2012),1-3.

Czernichowski, et al., "English Language Abstract", FR 2873306, (Jan. 27, 2006),1-2.

Merkling, Matthew J., "Non final Office Action", U.S. Appl. No. 12/537,953, (Feb. 23, 2012),1-7.

Merkling, Matthew J., "Final Office Action", U.S. Appl. No. 12/537,953, (May 29, 2012),1-9.

Chouinard, Sebastien "Notice of Requisition", CA App. No. 2612320 (Corresponding to U.S. Appl. No. 11/167,572), (Jan. 25, 2010),1-4.

Chouinard, Sebastien "Notice of Requisition", CA App. No. 2612320 (Corresponding to U.S. Appl. No. 11/167,572), (Nov. 4, 2010),1-2.

Merkling, Matthew J., "Non Final Office Action", U.S. Appl. No. 11/745,942, (Jun. 20, 2012),1-8.

Merkling, Matthew J., "Final Office Action", U.S. Appl. No. 11/745,942, (Oct. 1, 2012),1-8.

METHOD FOR FORMING SYNTHESIS GAS USING A PLASMA-CATALYZED FUEL REFORMER

GOVERNMENT RIGHTS

At least part of the technology disclosed in this patent application may have been funded by the United States Government under the following contracts: Department of Energy DE-FG-02-07ER84663, Department of Defense (Army) W56-HZV-07-C-0577 and Department of Defense (Navy) N00014-07-M-0450. The United States Government may have certain rights in the invention.

RELATED APPLICATIONS

This patent application is a divisional application of and claims priority to U.S. patent application Ser. No. 12/537,953, filed Aug. 7, 2009, which claims priority to U.S. Provisional Patent Application No. 61/087,549, filed Aug. 8, 2008, and which is a continuation-in-part of U.S. patent application Ser. No. 11/745,942, filed May 8, 2007, which claims priority to U.S. Provisional Patent Application No. 60/798,863, filed May 8, 2006. These applications are incorporated by reference.

FIELD OF THE INVENTION

The present invention relates to liquid fuel reformation and more particularly to systems and methods for reforming liquid fuels for use in fuel cell systems.

DESCRIPTION OF THE RELATED ART

As a society, we often take for granted the mobility (power and range) afforded by the energy storage density of common transportation fuels such as gasoline, aviation kerosene, and diesel fuel. The legacy investment in the refueling infrastructure alone makes it apparent that fuel cell technology capable of utilizing these existing fuels may have a distinct advantage over those restricted to high purity hydrogen or other less widely available fuels. The ability to utilize reformate produced from these existing transportation fuels, as well as from emerging non-petroleum based fuels such as bio-diesel, and synthetic (Fischer-Tropsch) liquids, without the need for extensive cleanup is one of the greatest advantages of solid oxide fuel cells (SOFCs).

The higher efficiency of fuel cells compared to conventional engines is one of the main characteristics motivating the development and eventual commercialization of fuel cells. In stationary applications, utilizing natural gas fuel, this efficiency advantage is well established. However, where liquid fuels are used, a fuel processor used to reform liquid fuel exacts a heavy efficiency penalty on a fuel cell system. Historically, the sulfur and aromatic content of transportation fuels has made them impossible to reform using the catalytic steam reforming process used with natural gas systems, due to problems with "poisoning" the catalyst and carbon buildup. Instead, partial oxidation processes (e.g., POX, CPOX, ATR, etc.) have been employed, with varying degrees of practicality.

Although reformate produced by partial oxidation typically represents about 80% of the energy content of the fuel as measured by heating value, the use of any partial oxidation process coupled to any type of fuel cell results in a loss in the range of 30 to 40% of the electric power generation potential of the fuel. This is primarily due to the fact that a fuel cell is not a heat engine. Rather, a fuel cell may be considered a Faradaic engine, and the Faradaic (current producing) potential of any fuel cell is reduced by 4 Coulombs for each mole of $O_2$ introduced in the partial oxidation process. Although steam reforming does not suffer from such an effect, no suitable catalysts are known for high-sulfur, hydrogen-lean transportation fuels.

In view of the foregoing, what is needed is an improved system and method for generating reformate from various fuels that improves the Faradaic efficiency of fuel cells, such as solid oxide fuel cells (SOFCs), molten-carbonate fuel cells (MCFCs), or phosphoric acid fuel cells (PAFCs). Ideally, such a system and method would be capable of reforming fuels with high sulfur content (e.g., 10,000 ppm) without requiring sulfur pre-removal, while avoiding problems such as "poisoning" the catalyst or carbon buildup. Further needed is system and method for utilizing the heat generated by fuel cells such as SOFCs and MCFCs to improve the overall efficiency of fuel reformation and electricity production.

SUMMARY OF THE INVENTION

The invention has been developed in response to the present state of the art and, in particular, in response to the problems and needs in the art that have not yet been fully solved by currently available apparatus and methods. Accordingly, the invention has been developed to provide a plasma-catalyzed, thermally integrated reformer for fuel cell systems. The features and advantages of the invention will become more fully apparent from the following description and appended claims, or may be learned by practice of the invention as set forth hereinafter.

Consistent with the foregoing, an improved reformer is disclosed herein. In one embodiment, such a reformer may include a plasma zone to receive a pre-heated mixture of reactants and ionize the reactants by applying an electrical potential thereto. The ionized species are strongly accelerated to the oppositely charged electrode. In the process they undergo collisions which create free radicals, as well as species having excess translational, vibrational and electronic energy states compared to the equilibrium distributions predicted by kinetic theory. Species having any of these activated states are more reactive, and also change the reactions pathway. For convenience in describing this effect, and since the process starts with ionization, the collection of activated species will be referred to as ionized reactants. A first thermally conductive surface surrounds the plasma zone and is configured to transfer heat from an external heat source into the plasma zone. The reformer further includes a reaction zone to chemically transform the ionized reactants into synthesis gas comprising hydrogen and carbon monoxide. A second thermally conductive surface surrounds the reaction zone and is configured to transfer heat from the external heat source into the reaction zone. The first thermally conductive surface and second thermally conductive surface may both be directly exposed to the external heat source.

A corresponding method and system are also disclosed and claimed herein.

BRIEF DESCRIPTION OF THE DRAWINGS

In order to describe the manner in which the above-recited features and advantages of the present invention are obtained, a more particular description of apparatus and methods in accordance with the invention will be rendered by reference to specific embodiments thereof, which are illustrated in the appended drawings. Understanding that these drawings depict only typical embodiments of the present invention and are not, therefore, to be considered as limiting the scope of the invention, apparatus and methods in accordance with the present invention will be described and explained with additional specificity and detail through the use of the accompanying drawings in which.

DETAILED DESCRIPTION OF THE INVENTION

It will be readily understood that the components of the present invention, as generally described and illustrated in the Figures herein, could be arranged and designed in a wide variety of different configurations. Thus, the following more detailed description of the embodiments of apparatus and methods in accordance with the present invention, as represented in the Figures, is not intended to limit the scope of the invention, as claimed, but is merely representative of certain examples of presently contemplated embodiments in accordance with the invention. The presently described embodiments will be best understood by reference to the drawings, wherein like parts are designated by like numerals throughout.

Figure 1:
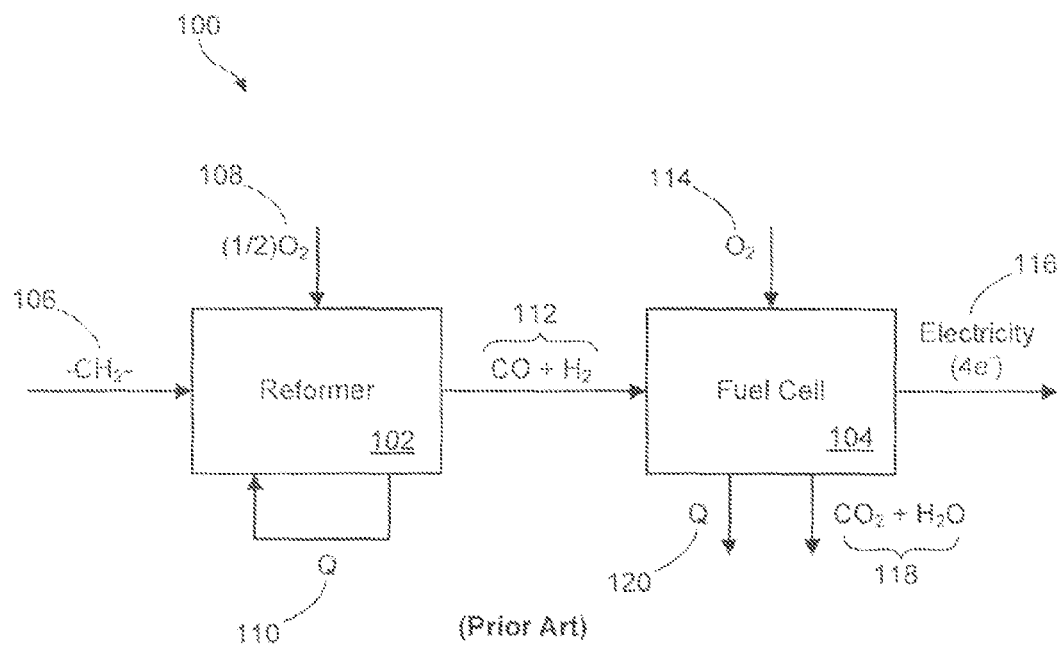
FIG. 1 is a high-level block diagram of one prior art system for generating synthesis gas for a fuel cell.

Referring to FIG. 1, in general, a prior art system 100 for producing electricity using a feedstock fuel 106 as an input may include a reformer 102, or fuel processor 102, and a fuel cell 104. The reformer 102 may receive and process a hydrocarbon feedstock fuel 106 to produce synthesis gas 112 containing a mixture of carbon monoxide and hydrogen gas. This synthesis gas 112 in addition to oxygen 114 may be used by the fuel cell 104 to produce electricity 116. In certain embodiments, the fuel cell 104 may generate $CO_2+H_2O$ 118 and heat 120 as a byproduct.

Where natural gas or methane is used as the feedstock fuel 106, a reformer 102 may utilize a process such as steam methane reforming (SMR) to produce synthesis gas 112. This process generally involves reacting the methane with steam in the presence of a metal-based catalyst to produce the desired synthesis gas 112. SMR and similar processes, however, are unable to reform liquid transportation fuels such as conventional diesel, heavy fuel oil, or jet fuel (e.g., JP-8, JP-10, Jet-A, etc.). This is because the sulfur and aromatic content of transportation fuels makes them difficult or impossible to reform using SMR, at least in part because of problems with "poisoning" the catalyst and carbon buildup. Instead, partial oxidation processes (e.g., POX, CPOX, ATR, etc.) are normally employed to reform transportation fuels.

In general, a partial oxidation process may include partially combusting a sub stoichiometric mixture of fuel 106 (which may include chains of $CH_2$ groups) and oxygen 108. The combustion reaction is exothermic and provides heat 110 necessary to reform the remaining fuel 106 to generate synthesis gas 112, the reformation reaction of which is endothermic. The heat of reformation is on the order of 30 percent of the heat generated by completely combusting the fuel 106, which can be obtained by partially combusting the fuel. Where fuels 106 are high in sulfur content, partial oxidation reactors may employ non-catalytic partial oxidation of the feed stream 106 with oxygen 108 in the presence of steam at temperatures exceeding 1200° C.

The stoichiometric reformation reaction occurring at the reformer 102 and using oxygen 108 as the oxidant may be represented generally as follows:

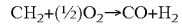

$$CH_2+(\tfrac{1}{2})O_2 \rightarrow CO+H_2$$

At the fuel cell 104, the synthesis gas 112 and oxygen 114 is converted to electricity 116, carbon dioxide 118, and steam 118 in accordance with the following equation:

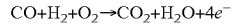

$$CO+H_2+O_2 \rightarrow CO_2+H_2O+4e^-$$

As can be observed from the above equations, each $CH_2$ group generates about $4e^-$ (4 electrons) of electricity using a conventional partial oxidation reformer.

Although effective, partial oxidation techniques exact a heavy efficiency penalty on the fuel cell 104. The use of partial oxidation techniques coupled to a fuel cell 104 results in a loss in the range of 30 to 40 percent of the electric power generation potential of the fuel 106. More specifically, the Faradaic (current producing) potential of a fuel cell 104 is reduced by 4 coulombs for each mole of oxygen 108 introduced in the partial oxidation process. Although steam reforming does not suffer from this effect, no suitable catalysts are known for high-sulfur, hydrogen-lean transportation fuels.

It will be appreciated by those of skill in the art that at least one reactant may be obtained as a product of the fuel cell reaction. For example, in one embodiment, $CO_2$ from the fuel cell may be introduced as the reactant for the plasma reformer. In another embodiment, steam from the fuel cell may be introduced as the reactant for the plasma reformer.

Figure 2:
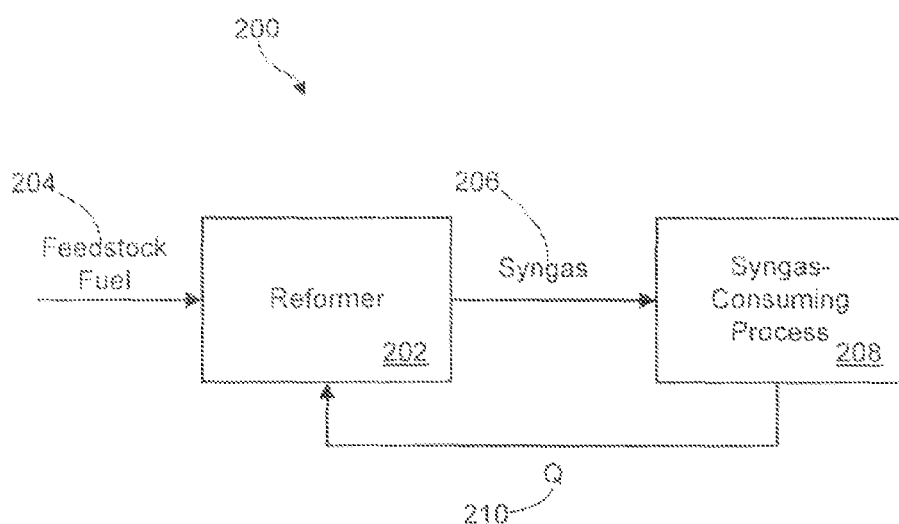
FIG. 2 is high-level block diagram of one embodiment of a system in accordance with the invention, providing improved synthesis gas production.

Referring to FIG. 2, in general, to overcome the efficiency penalty of the above-mentioned reformers, an improved system 200 in accordance with the invention may include a sulfur-tolerant reformer 202 capable of reforming feedstock fuels 204 with high sulfur content (e.g., greater than 50 ppm sulfur content) to generate synthesis gas 206. This synthesis gas 206 may be utilized by a synthesis gas consuming process 208, such as a fuel cell 104 or other device or process which consumes synthesis gas 206, which also generates heat 210 as a byproduct. The heat 210 from the consuming process 208 may be transferred to the reformer 202 where it may be used to drive the synthesis gas generating reaction, improving the yield of synthesis gas 206 from the reformer 202 and the overall efficiency of the system 200.

Figure 3:
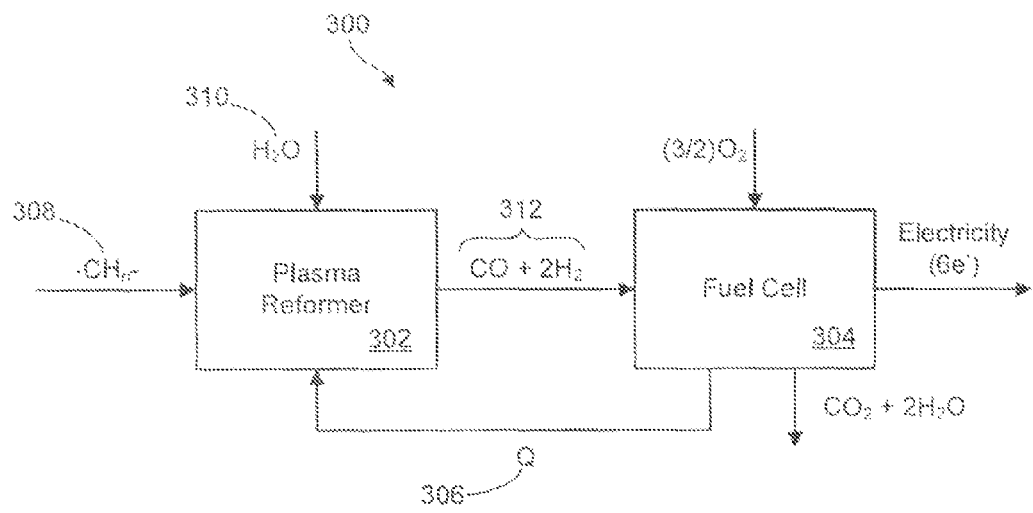
FIG. 3 is a high-level block diagram of one embodiment of a reformer in accordance with the invention, integrated with a fuel cell.

Referring to FIG. 3, one embodiment of a system 300 functioning in accordance with the system 200 described in FIG. 2 may include a plasma reformer 302 and a fuel cell 304 generating heat 306 as a byproduct. In selected embodiments, the fuel cell 304 is a solid oxide fuel cell, molten carbonate fuel cell, or other fuel cell which operates at high temperatures (e.g., greater than 600° C.). As will be explained in more detail hereafter, the plasma reformer 302 may be used to reform fuels 308 with high sulfur content without the problems associated with catalyst poisoning or carbon buildup. Thus, the plasma reformer 302 may be suitable to reform high-sulfur, liquid transportation fuels such as diesel, heavy fuel oil, or jet fuel.

Heat 306 generated by the fuel cell 304 may be transferred to the reformer 302 to provide heat of reformation to the reactants 308, 310. This may reduce or eliminate the need to combust a portion of the fuel 308 to provide heat of reformation since it is provided by the fuel cell 304. Consequently, the amount of oxygen 108 used as the oxidant (as described in FIG. 1) and used to combust the fuel 308, may be reduced or mostly eliminated and replaced with steam 310. The substitution of steam 310 makes the reaction endothermic, but produces an additional $H_2$ or CO molecule which provides additional fuel to the fuel cell 304.

To illustrate this effect, the stoichiometric reaction occurring at the reformer 302 and using steam 310 as an oxidant may be represented generally as follows:

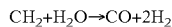

$$CH_2 + H_2O \rightarrow CO + 2H_2$$

At the fuel cell 304, the synthesis gas 312 is converted to electricity, carbon dioxide, and water in accordance with the following equation:

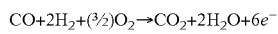

$$CO + 2H_2 + (3/2)O_2 \rightarrow CO_2 + 2H_2O + 6e^-$$

As can be observed from the above equations, each $CH_2$ group generates $6e^-$ of electricity, which constitutes a 50 percent increase over the $4e^-$ generated by the partial oxidation process described in FIG. 1. The result is an improvement in efficiency comparable to that achievable with steam methane reforming, but novel in that it is able to use a high-sulfur, hydrogen-lean feedstock fuel 308 as the input. A similar efficiency benefit can also be achieved by using $CO_2$ as the reactant to replace a portion or all of the steam necessary for the reformation reaction. The mixture of steam and $CO_2$ may be obtained from the reaction product of the fuel cell.

In general, a solid oxide fuel cell converts about 50 percent of the heating value of the synthesis gas 312 to electricity and the other 50 percent to heat. Because only about 30 percent of the heating value is needed to reform the feedstock fuel 308 to synthesis gas 312, a solid oxide fuel cell produces sufficient heat 306 to provide the necessary heat of reformation to the reformer 302. Nevertheless, even where the heat 306 generated by a fuel cell 304 is insufficient to provide the required heat of reformation, the heat 306 may be supplemented by other sources (e.g., by partially combusting the feedstock fuel or using other sources of waste heat) until it is sufficient. In this way, any significant amount of heat 306 generated by the fuel cell 304 may be recycled, rather than wasted, to improve the efficiency of the reformer 302.

Figure 4:
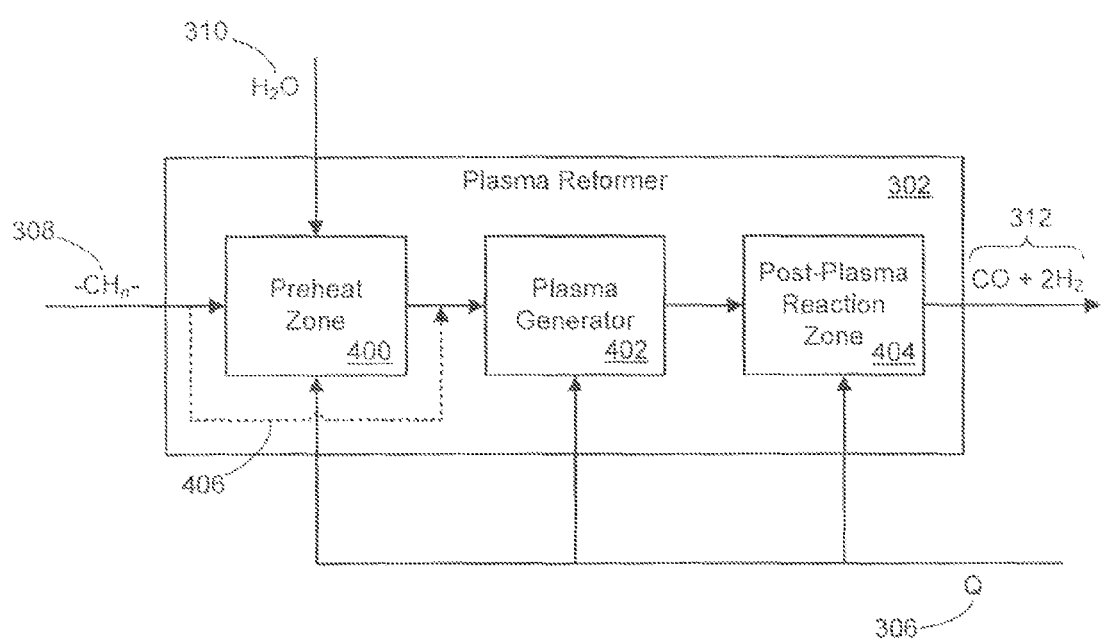
FIG. 4 is a high-level block diagram of one embodiment of a reformer in accordance with the invention.

Referring to FIG. 4, in selected embodiments, a plasma reformer 302 in accordance with the invention may include a preheat zone 400, a plasma generator 402, and a post plasma reaction zone 404. The preheat zone 400 may be used to preheat the reactants 308 to the required reforming temperature range. Because the reformation reaction is highly endothermic, the reactants 308, 310 need to be heated significantly in order to generate the desired synthesis gas 312. The thermodynamics of the reaction are such that synthesis gas production starts to increase at about 400° C. and maximizes at about 800° C. Thus, the reactants are ideally heated to a temperature at or around 800° C. to maximize synthesis gas production. The reactants 308, 310 are ideally preheated somewhere near this temperature when they pass through the plasma generator 402, which acts as a catalyst to initiate the reformation reaction. In selected embodiments, only the steam 310 (as well as air, oxygen, or $CO_2$ mixed with the steam) is preheated. The feedstock fuel 308 may be mixed with the steam 310 just prior to passing through the plasma generator 402 (as indicated by the dotted line 406). This may prevent the feedstock fuel 308 from becoming too hot, thermally decomposing, and clogging up the system.

The preheat zone 400 may also be used to vaporize (i.e., convert to gas or mist) the reactants 308, 310 prior to routing them through the plasma generator 402. Reactants 308, 310 in a solid or liquid form may provide clusters of condensed matter which may act as nucleation sites. This may cause solid carbon nucleation which, although unavoidable, may be reduced by vaporizing the reactants 308, 310. In some cases, however, the reformer 302 may be used to process a feedstock fuel having a greater solid fraction. For example, a feedstock fuel such as a coal water slurry (i.e., coal dust entrained in water) or coal dust suspended in gas, which may have an energy content similar to jet fuel, may be vaporized as much as possible prior to being passed to the plasma generator 402. Nevertheless, feedstock fuels in pure gas form (e.g., natural gas, biogas, etc.) may be preferable to avoid carbon formation.

Once preheated, the reactants 308, 310 may be passed to the plasma generator 402 to ionize or break apart one or more of the reactants 308, 310 to create reactive elements. As will be explained in more detail hereafter, in selected embodiments, the plasma generator 402 may ionize the reactants 308, 310 with a gliding electrical arc. This gliding arc may provide the function of a physical catalyst by activating and initiating the reformation reaction. However, the gliding arc continually renews the active species whereas a physical catalyst relies on surface energy that can be "poisoned" by absorption of sulfur or buildup of carbon on the surface. The energy used to generate the gliding electric arc may be on the order of 1 or 2 percent of the heating value of the fuel 308 being processed. If a fuel cell 304 is 50 percent efficient (i.e., converts 50 percent of the fuel's electrical potential to electricity), then only 4 percent of the fuel cell's electricity is needed to operate the plasma generator 402. This represents an efficiency improvement over partial oxidation techniques, which may consume 30 percent or more of the fuel's electrical potential when the fuel is partially combusted.

After ionization, the reactants may be passed to a reaction zone 404 to absorb additional heat of reformation and complete the endothermic reactions. As vaporized reactants and products of the reactants leave the plasma generator 402, some packets of gas may be oxygen rich while others may be oxygen lean. To further complete the reaction, the reactants may be physically mixed or homogenized by passing them through a chemical buffering compound, such as a solid state oxygen storage compound. Here, the storage compound may absorb oxygen from oxygen-rich packets while releasing oxygen to oxygen-lean packets. This provides both spatial and temporal mixing of the reactants to help the reaction continue to completion.

In other embodiments, the reaction zone 404 may contain catalysts suitable for promoting equilibration of gas species at temperatures different than the reforming reaction. That is, the temperature of the synthesis gas produced in the reaction zone 404 may be reduced and other reactions may be initiated. For example, the synthesis gas may be used to produce methane within the reaction zone 404. Similarly, the synthesis gas may be "shifted" to produce more hydrogen at the expense of carbon monoxide. This may be performed, for example, by passing the synthesis gas over an iron catalyst at temperatures below 400° C. In other embodiments, the reaction zone 404 may also be used to cool reaction products leaving the reformer 302.

Figure 5A:
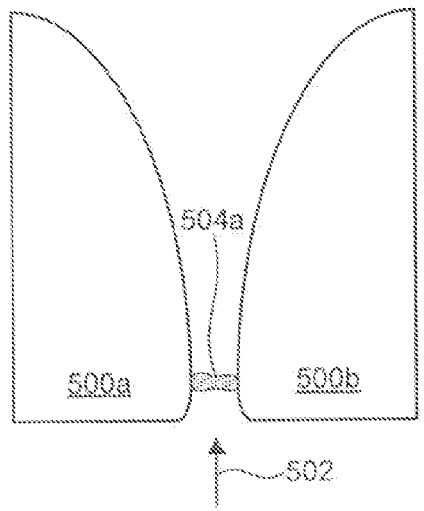
FIGS. 5A through 5C are several schematic profile views of an embodiment of a gliding arc plasma generator.
Figure 5B:
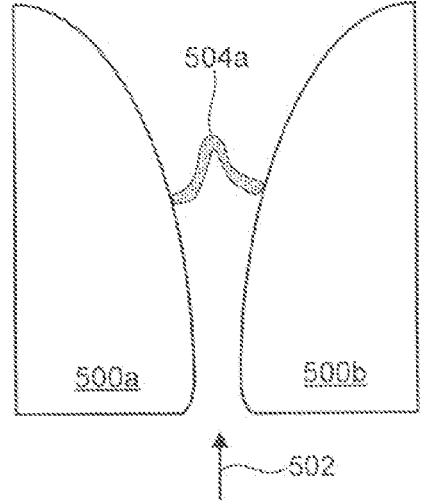
Figure 5C:
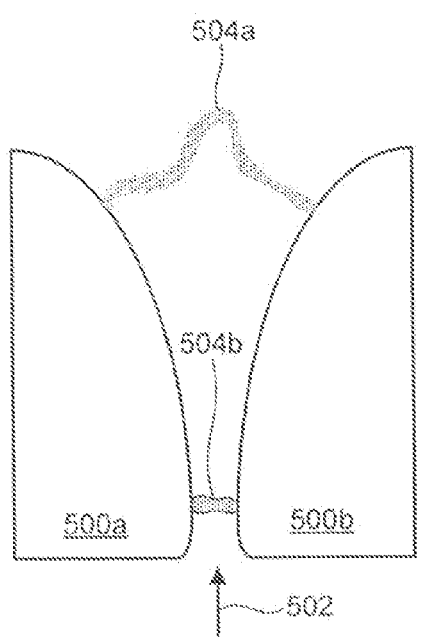

Referring to FIGS. 5A through 5C, in selected embodiments, a plasma generator 402 in accordance with the invention may include a pair of electrodes 500a, 500b having a large potential difference there between (e.g., 6 kV to 12 kV typical). A preheated vapor stream containing the reactants 308, 310 may be directed between the electrodes 500a, 500b in the direction 502. The high voltage ionizes the gas which allows current to flow, creating an arc 504a, as shown in FIG. 5A. Because the ions are in an electric field having a high potential gradient, the ions begin to accelerate toward one electrode 500a or the other 500b depending on their charge. This provides tremendous kinetic energy for initiating the reformation reaction in addition to providing means for ionizing the reactants or simply breaking the reactants into radicals to create more reactive species.

Under the influence of the flowing gas, the ionized particles are swept downstream in the direction 502, with the ionized particles forming the least resistive path for the current to flow. As a result, the arc 504a moves downstream and spreads out as it follows the contour of the electrodes 500a, 500b, as shown in FIG. 5B. Eventually, the gap becomes wide enough that the current ceases to flow. The ionized particles, however, continue to move downstream. Once the current stops flowing, the potential builds up on the electrodes 500a, 500b until it once again ionizes the gas flowing there between. This creates a new arc 504b at a narrower region between the electrodes 500a, 500b, as shown in FIG. 5C. This process then repeats itself. Most of the endothermic reformation reaction may actually occur in the plasma area (i.e., the area between the electrodes 500a, 500b) or immediately downstream from the plasma area.

Figure 6:
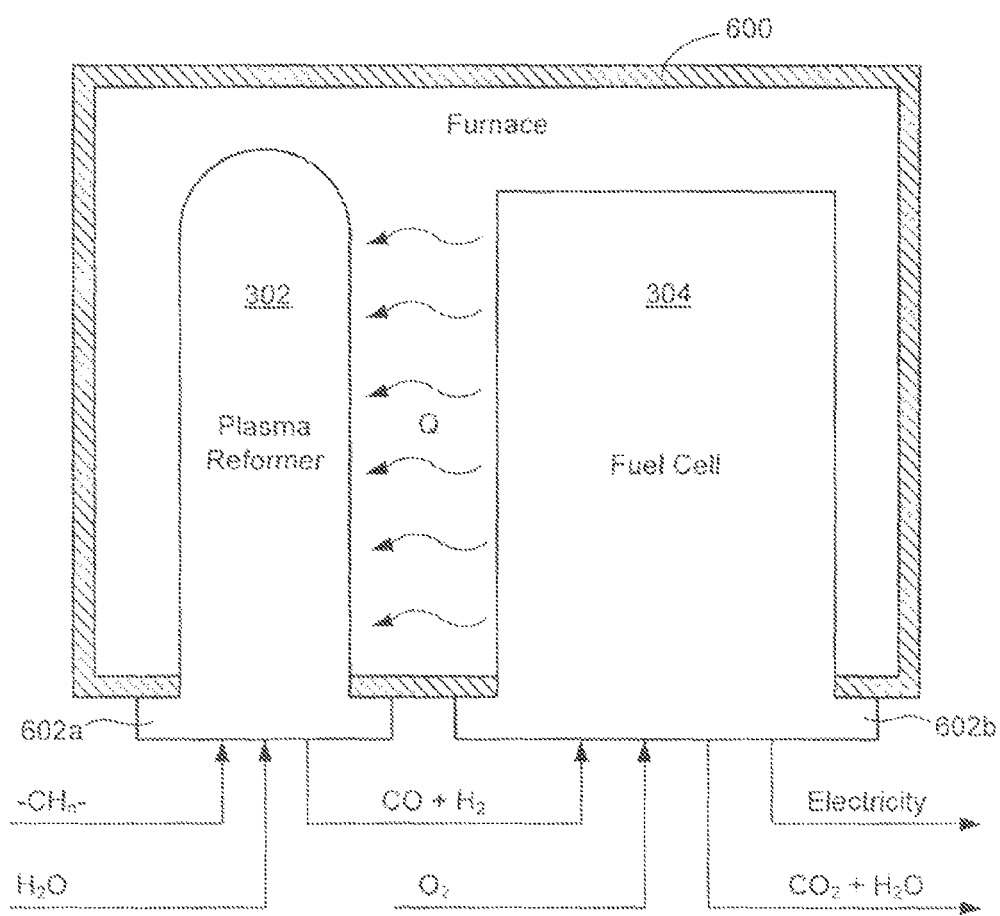
FIG. 6 is a high-level block diagram of a thermally integrated reformer and fuel cell.

Referring to FIG. 6, in order to provide heat of reformation to the reformer 302, a design is needed to provide adequate heat transfer to the preheat zone 400, plasma generator 402, and reaction zone 404 of the reformer 302. In selected embodiments, the reformer 302 and a fuel cell 304 may be placed inside a furnace 600 or other insulated enclosure 600 in order to retain heat and effectively transfer heat between the two components 302, 304. In this embodiment, heat generated by the fuel cell 304, which may include heat generated through electrical resistance as well as heat generated electrochemically, may be transferred to the reformer 302 through radiation, convection, or a combination thereof.

Accordingly, instead of insulating the reformer 302 to retain heat, the reformer 302 may be designed to conduct heat through an exterior wall where it may be transferred to internal components and fluids. In certain embodiments, residual synthesis gas or other fuel in the exhaust of the fuel cell 304 may be burned to provide additional heat to the reformer 302. In other contemplated embodiments, heat may be transferred to the reformer 302 using a heat exchanger, such as a counter current heat exchanger. This may be used, for example, to preheat steam used by the reformer 302 with steam generated by the fuel cell 304.

In selected embodiments, the reformer 302 and fuel cell 304 may include a "cold" or reduced temperature region 602a, 602b. This enables pipes or wires, which must often be welded to join them together or cut to disassemble, to be connected to the reformer 302 or fuel cell 304 in a region of reduced temperature. Accordingly, channels for conveying the feedstock fuel, air and steam, synthesis gas, and the like, as well as wires for conducting electricity may be connected to the reformer 302 and fuel cell 304 in the reduced temperature regions 602a, 602b.

Figure 7:
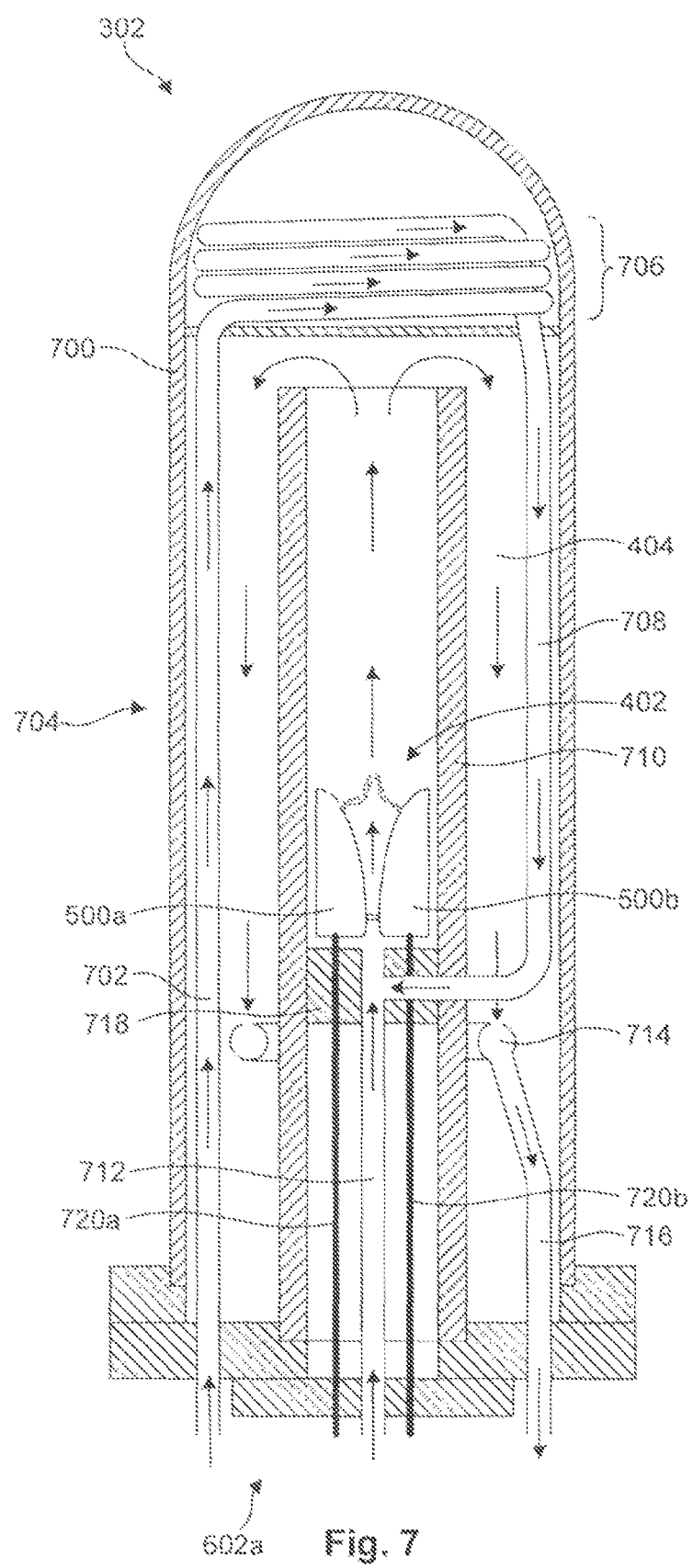
FIG. 7 is a cutaway schematic view of one embodiment of a reformer in accordance with the invention.

Referring to FIG. 7, in one embodiment, a reformer 302 providing adequate heat transfer to the reactants may include an outer shell 700 to absorb heat radiated or otherwise conveyed from a fuel cell 304 or other external heat source. The outer shell 700 may be made of stainless steel or other materials having sufficient strength and stability at temperatures exceeding 800° C. In addition to providing a heat transfer mechanism to conduct heat to the reactants 308, 310, the outer shell 700 provides a gas containment envelope that keeps the reactants 308, 310 as well as the products of the reactants (e.g., synthesis gas) isolated from the external environment.

A first channel 702 may be used to convey a mixture of air and steam 310 into the reformer 302. In certain embodiments, the channel 702 may originate in a low temperature region 602a of the reformer 302 and travel through a hot region 704 to preheat and further vaporize the air and steam 310. In selected embodiments, the channel 702 may be coupled to a coil 706 to provide additional surface area to further preheat and vaporize the air and steam 310. The coil 706 may be coupled to a channel 708 to convey the preheated air and steam 310 into an electrically insulated region, such as the inside of a non-conductive tube 710. The non-conductive tube 710 may be made of a material such as an alumina ceramic and may prevent electricity from discharging from the plasma generator 402 to the conductive outer shell 700, channels 702, 708, or other conductive surfaces.

Once the air and steam 310 are preheated, it may be mixed with a feedstock fuel conveyed through a feed channel 712. In selected embodiments, this may occur within a mixing manifold 718 inside the non-conductive tube 710. Where the feedstock fuel is a liquid or solid, the air and steam 310 is ideally preheated sufficiently to vaporize the feedstock fuel 308 as it mixes with the air and steam 310. This preheated mixture is then introduced at some velocity between the electrodes 500a, 500b of the plasma generator 402 where it is ionized or broken into radicals to create more reactive species and thereby initiate the reformation reaction. The electrodes 500a, 500b may be connected to current-carrying conductors 720a, 720b connected to a voltage source outside of the reformer 302. In the plasma area and the area immediately thereafter, most of the reactants may be converted to synthesis gas.

The synthesis gas and any residual reactants may then be conveyed through the non-conductive tube 710 and into an annular reaction zone 404, where residual reactants may absorb additional heat of reformation and continue to react to form synthesis gas or other desired products. Here, the reactants may be homogenized by passing them through a pack bed of chemical buffering compounds, such as the solid state oxygen storage compound previously mentioned, to promote further reaction. The pack bed may also serve to physically mix the reactants. In selected embodiments, the reactants and the products of the reactants may also be passed over catalysts suitable for promoting equilibration of gas species at temperatures different than the reforming reaction.

The resulting products of reaction (e.g., synthesis gas) and any residual reactants (e.g., hydrocarbons, steam, oxygen, etc.) as well as nitrogen from the air may be collected through a port, such as a ring-shaped collection manifold 714 or other suitable collection device disposed within the annular reaction zone 404. This fuel mixture may then be conveyed through a channel 716 where it may be transmitted to a fuel cell 304 for use as fuel. In selected embodiments, the annular region beneath the collection manifold 714 may be filled with an insulating material to maintain a temperature differential between the low temperature zone 602a and the hot zone 704.

Figure 8A:
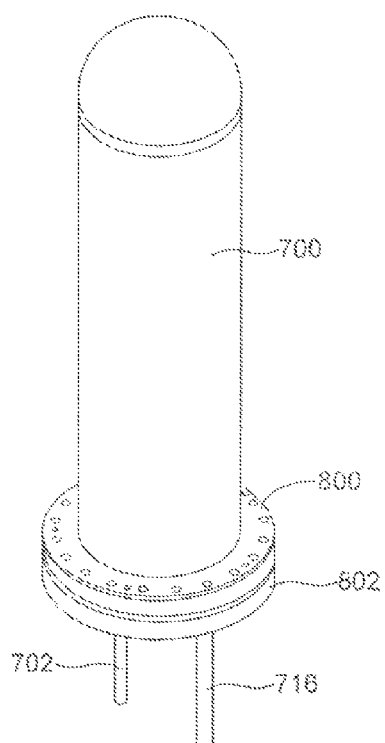
FIGS. 8A through 8C are several perspective views of various components of a reformer in accordance with the invention.
Figure 8B:
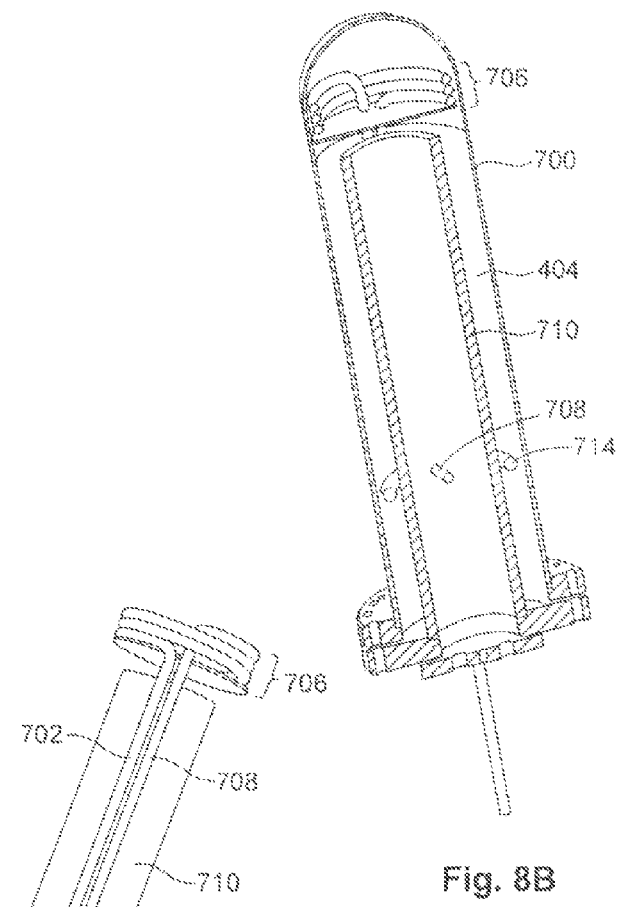
Figure 8C:
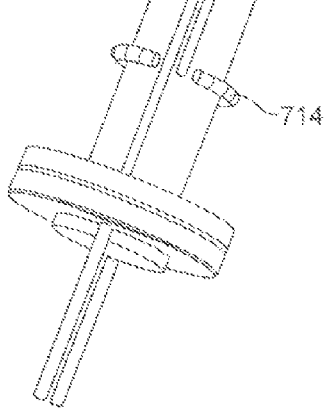

FIGS. 8A through 8C show several perspective and cutaway perspective views of one embodiment of a reformer 302 working in accordance with the principles described in association with FIG. 7. FIG. 8A shows one embodiment of an outer shell 700 having a flange 800 mountable to a furnace or other surface. A second flange 802 may be attached to many of the reformer's internal components, allowing them to be removed from the outer shell 700 without removing or detaching the outer shell 700. Channels 702, 716 may be used to convey reactants and the products of reactants to and from the reformer 302.

FIG. 8B shows a cutaway view of the outer shell 700, the inner non-conductive tube 710, and the coil 706. Also shown is a channel 708 to convey preheated air and steam through a wall of the non-conductive tube 710 into the insulated core of the tube 710. Also shown is a ring-shaped collection manifold 714 to collect synthesis gas and other residual materials from the annular reaction zone 404. FIG. 8C shows various internal components of the reformer 302 with the outer shell 700 removed, including the non-conductive tube 710, the coil 706, the channels 702, 708, and the collection manifold 714.

Figures 9A, 9B:
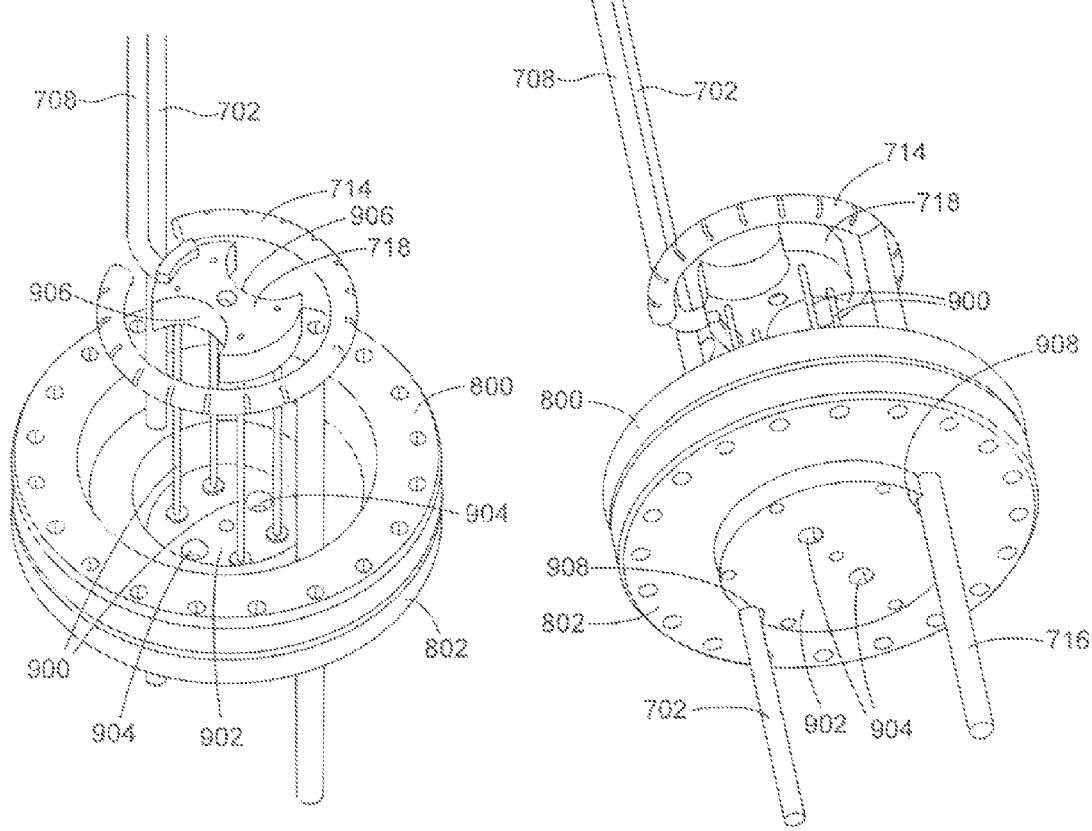
FIGS. 9A and 9B are perspective views of other components of a reformer in accordance with the invention.

FIGS. 9A and 9B show several perspective views of embodiments of the mixing manifold 718, collection manifold 714, channels 702, 708, and flanges 800, 802, with the outer shell 700 and non-conductive tube 710 removed. As shown, in one embodiment, the mixing manifold 718 may be sustained by several support bars 900 connected to a bottom mounting plate 902. The bottom mounting plate 902 may also be provided with apertures 904 to accommodate the current-carrying conductors 720a, 720b illustrated in FIG. 7.

In addition to carrying current, the conductors 720a, 720b may act as supports for the electrodes 500a, 500b. These conductors 720a, 720b may pass through cutout regions 906 of the mixing manifold 718, without touching the manifold 718, to support the electrodes 500a, 500b at a position above the manifold 718. In the apertures 904, the conductors 720a, 720b may be surrounded by high voltage insulators which prevent electricity from discharging to the mounting plate 902, while allowing the conductors 720a, 720b to pass through the plate 902.

In selected embodiments, the mounting plate 902 may be removed from the flanges 800, 802 to remove the mixing manifold 718 and electrodes 500a, 500b from the reformer assembly 302 while leaving the rest of the reformer 302 in place. In selected embodiments, one or more notches 908 may be formed in the mounting plate 902 to ensure proper alignment, for example, of the mixing manifold 718 with the channel 708.

Figure 10:
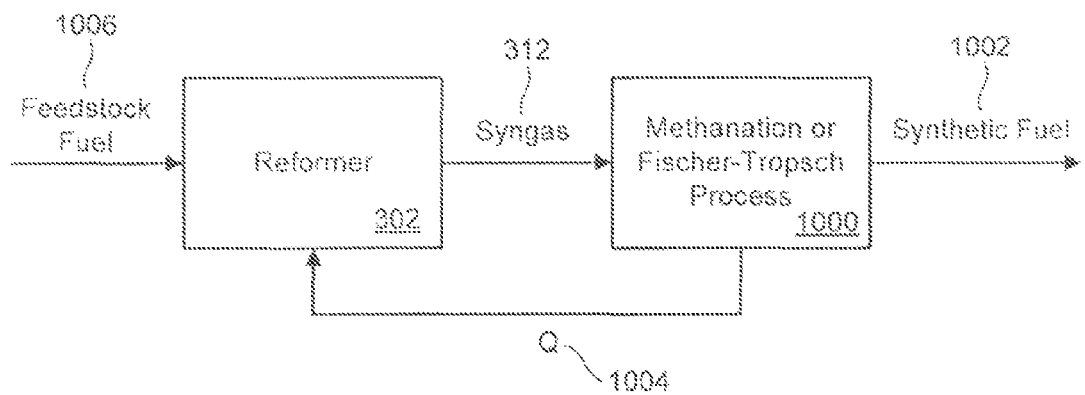
FIG. 10 is a high-level block diagram of one embodiment of a reformer integrated with a Fischer-Tropsch process and used to generate synthetic fuel.

Referring to FIG. 10, although particular reference has been made to fuel cells 104 herein, a reformer 302 in accordance with the invention may be used to improve the efficiency of other devices, systems, or processes that generate heat as a byproduct. For example, the reformer 302 may be used in conjunction with a Fischer-Tropsch process 1000 to create synthetic fuel 1002 using synthesis gas 312 as an input. As was described in association with FIG. 3, using steam as an oxidant (in place of oxygen) may produce synthesis gas with a hydrogen to carbon monoxide ratio of roughly two to one. This ratio provides an ideal synthesis gas input to a Fischer-Tropsch process 1000. It will be appreciated that the oxidant as a reactant may include oxygen or oxygen containing compounds such as steam, $CO_2$ or other compounds.

A Fischer-Tropsch process 1000 may include chemically reacting synthesis gas (i.e., carbon monoxide and hydrogen) in the presence of a catalyst to produce various types of liquid hydrocarbons. After extracting the liquid hydrocarbons, a tail gas may remain which may include a mixture of water vapor, carbon dioxide, methane, nitrogen, unreacted synthesis gas, as well as residual vapor hydrocarbon products. The tail gas may be recycled back to a gasification unit or to a Fischer-Tropsch reactor inlet or may be burned as fuel.

In selected embodiments, the tail gas may be burned to provide heat 1004 to a plasma reformer 302 in accordance with the invention. As previously described, this may allow steam to be used as the oxidant and may increase synthesis gas 312 production without requiring additional fuel 1006 at the reformer input. Furthermore, this provides synthesis gas with an improved hydrogen to carbon monoxide ratio (e.g., 2:1) for synthetic fuel production. Thus, a plasma reformer 302 in accordance with the invention may be used to improve synthetic fuel production when integrated with a Fischer-Tropsch process 1000.

Figure 11:
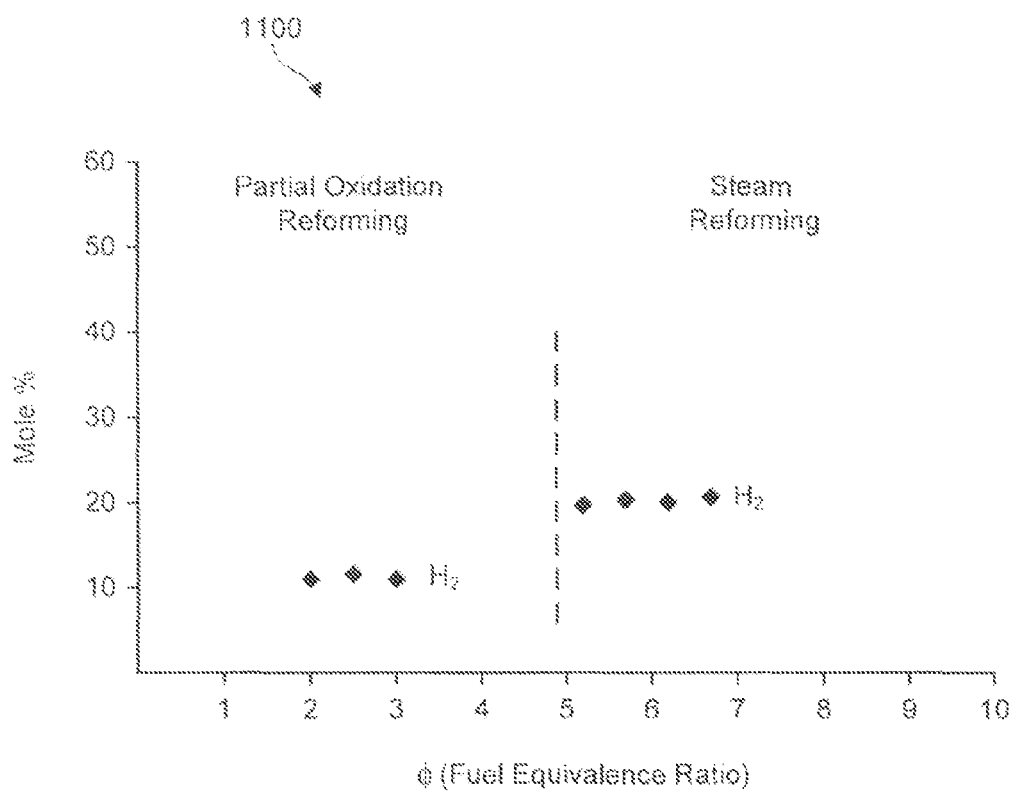
FIG. 11 is a graph showing the fuel equivalence ratio operating range for a multi-mode reformer.

Referring to FIG. 11, as described herein, the object of the reformer 302 is to break hydrocarbon molecules into hydrogen and carbon monoxide that can be used as fuel for the fuel cell 304. Each carbon atom in the hydrocarbon backbone must be joined with an oxygen atom, supplied either from free oxygen in air or from bound oxygen in steam or carbon dioxide, in order to cap the severed C—C and C—H bonds of the hydrocarbon. As a result, the atom ratio of oxygen to carbon (O/C) in the feed is important. At a minimum, the value of O/C should be greater than 1 to yield as much CO as possible and avoid the formation of solid carbon. However, only free oxygen that will support partial combustion is considered in the fuel equivalence ratio $\phi$ that we are trying to maximize (and thereby minimize use of free oxygen) in order to increase system efficiency.

FIG. 11 is a graph 1100 showing an example of the fuel equivalence ratio operating range of the reformer 302. As shown in the graph 1100, the reformer 302 may be configured to operate in multiple modes—partial oxidation (POX) mode and steam reforming mode, as well as transition modes there between. Values of $\phi$ less than 3.5 correspond to operation in partial oxidation mode, while values of $\phi$ greater than 4.5 correspond to operation in plasma-catalyzed steam reforming mode. The middle range, $3<\phi<5$, corresponds to the multi-mode transition from the purely POX operating mode to endothermic steam reforming mode. As can be seen from the graph 1100, the amount of hydrogen produced by the reformer 302 roughly doubles when the reformer 302 transitions from partial oxidation mode to steam-reforming mode. This provides additional fuel to a fuel cell 304 or other consuming device without requiring an increase in the amount of feedstock fuel input to the reformer 302.

To push the reformer 302 to operating modes with higher values of $\phi$, apparatus and methods are needed to more efficiently transfer heat into the plasma and reaction zones 402, 404. This will allow more of the heat of reformation to be provided from external sources (e.g., fuel cells 304, etc.) rather than from the partial oxidation process. Ideally, the reformer 302 will be designed such that it can transfer between about two and thirty percent of the heating value of the feedstock fuel present in the reformer into the plasma and reaction zones 402, 404 in order to provide part or all of the necessary heat of reformation. This will allow more of the oxygen needed to reform the feedstock fuel to be provided from steam or $CO_2$ as opposed to air.

Figure 12A:
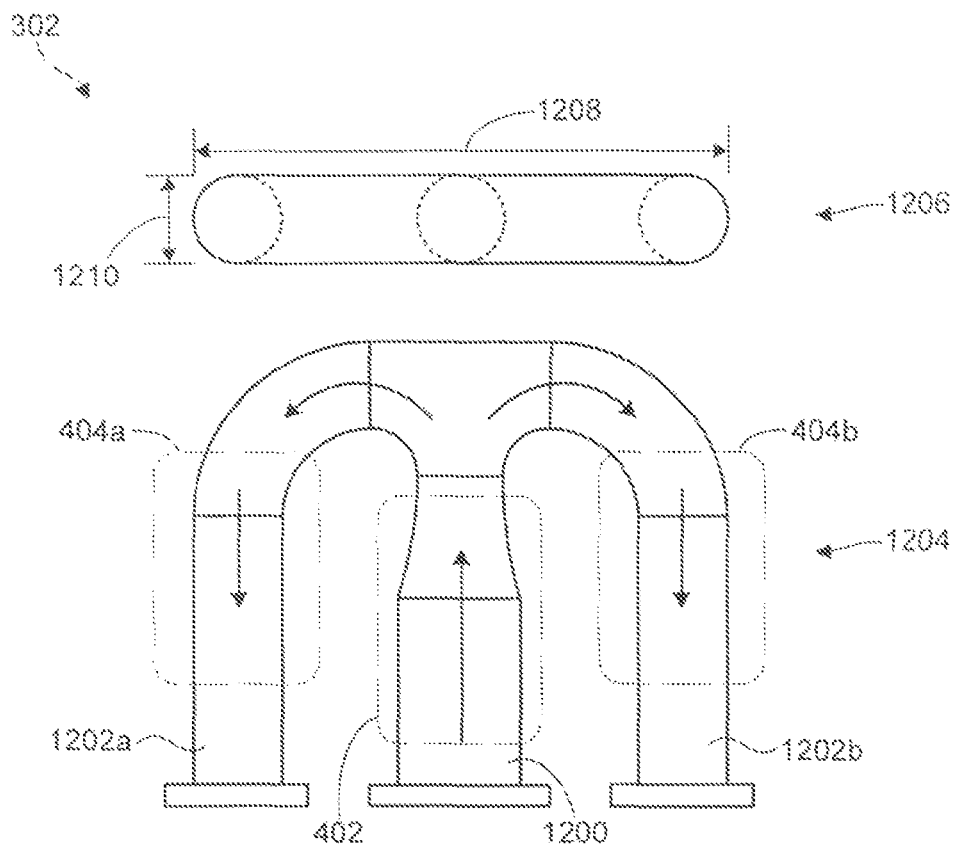
FIGS. 12A through 12D are side views of various different alternative shapes for the reformer.

Referring to FIG. 12A, in certain embodiments, the shape of the reformer 302 may be modified to allow more heat to be transferred into the plasma and reaction zones 402, 404. For example, FIG. 12A shows a side view 1204 and a top view 1206 of one example of an M-shaped reformer 302. In this example, the plasma zone 402 is located in the center portion 1200 of the M-shape and two post-plasma reaction zones 404a, 404b are provided in the two branches 1202a, 1202b of the M-shape. Consequently, a feedstock fuel and oxidant may flow through the center portion 1200 of the reformer 302 and split into two streams flowing into the branches 1202a, 1202b. One notable difference between the M-shaped reformer 302 and the reformer 302 illustrated in FIG. 7 is that the plasma and reaction zones 402, 404 are not co-axial but include distinct thermally conductive surfaces that are each exposed to an external heat source. The will ideally provide better heat transfer into the plasma and reaction zones 402, 404.

As can be seen from the top view 1206, the reformer 302 may be characterized by a length 1208 and a width 1210. In this embodiment, the length 1208 is significantly longer than the width 1210, giving the reformer 302 a length-to-width aspect ratio that is significantly greater than 1:1. This aspect ratio increases the reformer's surface area relative to its cross-sectional area to provide greater heat transfer into the reformer 302. In selected embodiments, the aspect ratio of the reformer (from the top view 1206) is greater than 1.5 to 1 to provide desired heat transfer into the reformer 302. In certain embodiments, the aspect ratio is selected to provide a surface area sufficient to transfer between about two and thirty percent of the heating value of the feedstock fuel in the reformer 302 into the plasma and reaction zones 402, 404.

Figure 12B:
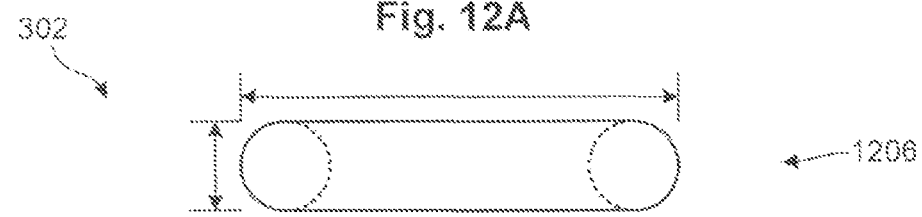
Figure 12B:
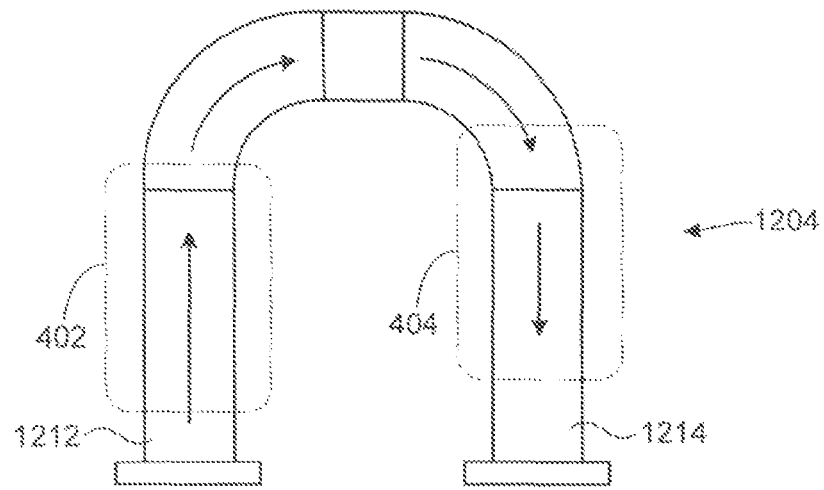

FIG. 12B shows a side view 1204 and a top view 1206 of another embodiment of a reformer 302, in this example a U-shaped reformer 302. In this example, the plasma zone 402 is located in a first side portion 1212 and the reaction zone 404 is located in the other side portion 1214. Like the M-shaped reformer 302, the plasma and reaction zones 402, 404 of the U-shaped reformer 302 include distinct thermally conductive surfaces that are exposed to the heat source. As is further evident from the top view 1206, the aspect ratio of the reformer 302 is significantly greater than 1:1, providing improved heat transfer into the reformer 302.

Figure 12C:
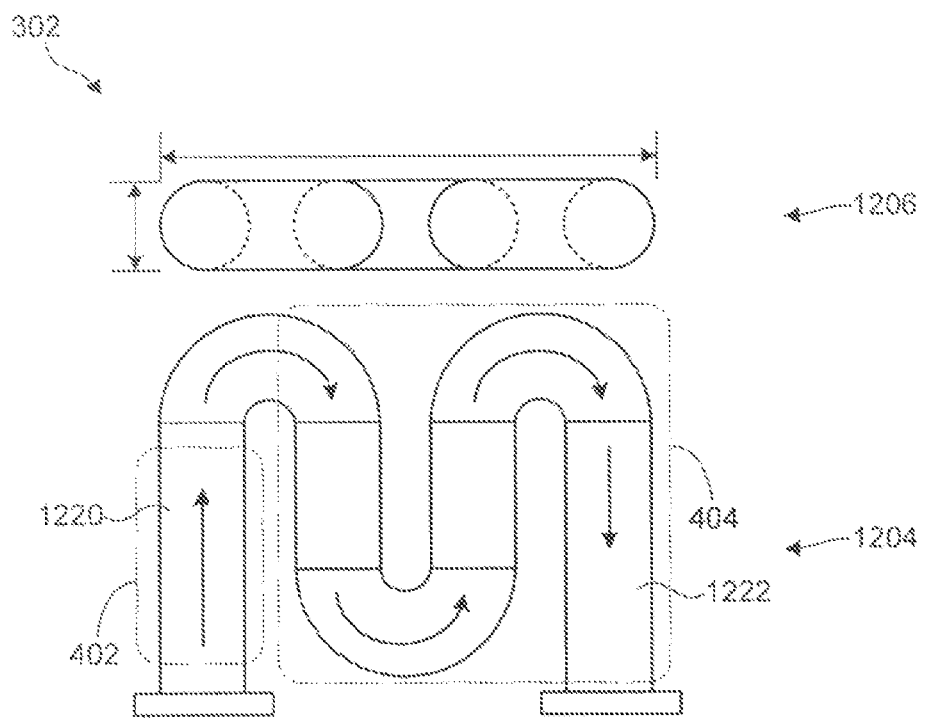

FIG. 12C shows a side view 1204 and top view 1206 of another embodiment of a reformer 302, in this example a serpentine-shaped reformer 302. In this embodiment, the plasma zone 402 may be located in a first portion 1220 of the serpentine shape and the reaction zone 404 may be located in a second portion 1222 of the serpentine shape. Like the reformers of FIGS. 12A and 12B, the plasma and reaction zones 402, 404 of the serpentine-shaped reformer 302 include thermally conductive surfaces that are both exposed to an external heat source. The aspect ratio of the reformer 302 is also significantly greater than 1:1, providing improved heat transfer into the reformer 302.

Figure 12D:
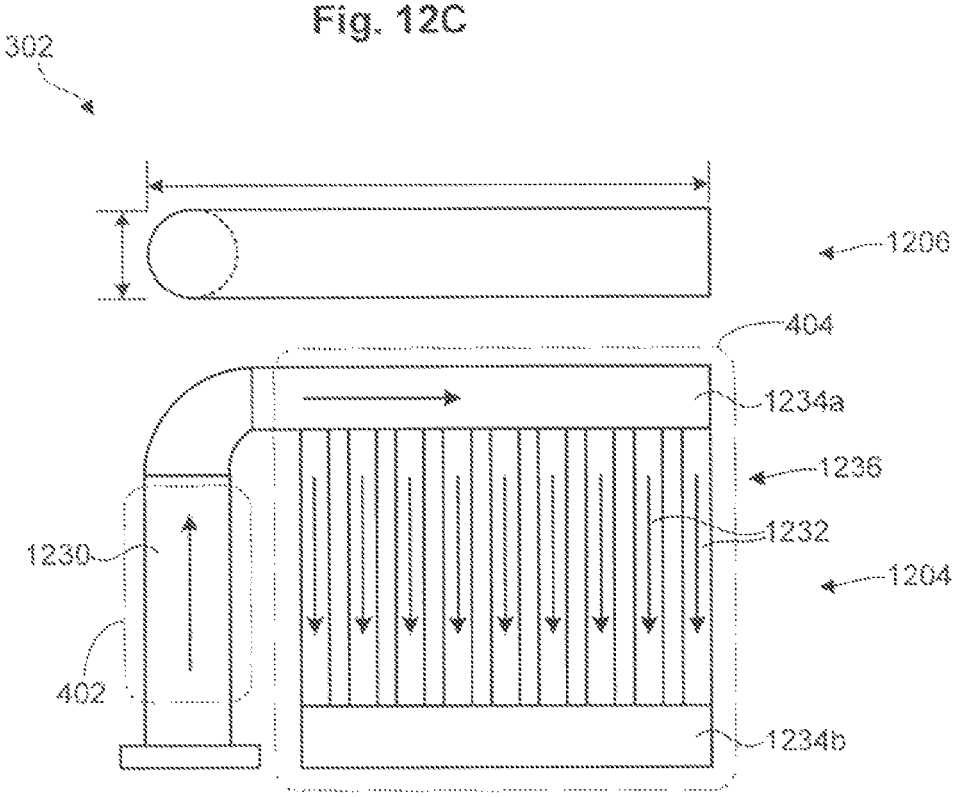

FIG. 12D shows yet another embodiment of a reformer 302, in this example a rectangular-shaped reformer 302. It will be appreciated by those of skill in the art that various configuration may be utilized and that a rectangular-shaped reformer 302 may be made of tubes in an arrangement the projects a rectangular outline. In this example, the plasma zone 402 is located in a first portion 1230 of the reformer 302 and the reaction zone 404 is located in a second portion 1236 of the reformer 302. In this embodiment, the reaction zone 404 includes one or more channels 1232 extending between a pair of headers 1234a, 1234b. This configuration is similar to the structure of a conventional steam radiator for heating a building, although the heat would be absorbed rather than emitted. The channel and header design significantly increases the surface area of the reformer 302, thereby increasing the heat transfer into the reformer 302. Like the reformers of FIGS. 12A through 12C, the plasma and reaction zones 402, 404 of the reformer 302 include distinct thermally conductive surfaces that are each directly exposed to the external heat source. Similarly, the aspect ratio of the reformer 302 is also significantly greater than 1:1.

The reformers 302 illustrated in FIGS. 12A through 12D are simply examples of different shapes that may be used to provide additional heat transfer into the plasma and reaction zones 402, 404. Other shapes are possible and within the scope of the invention. In general, any reformer 302 having plasma and reaction zones 402, 404 with distinct exposed thermally conductive surfaces is deemed to fall within the scope of the invention. Furthermore, any reformer 302 having an aspect ratio (as seen from the top view 1206) that is greater than 1:1, or in other embodiments greater than 1.5:1, is also deemed to fall within the scope of the invention. In other embodiments, any reformer 302 having a surface area sufficient to transfer between about two and thirty percent of the heating value of the feedstock fuel presently in the reformer 302 into the plasma and reaction zones 402, 404 is deemed to fall within the scope of the invention.

Figure 13:
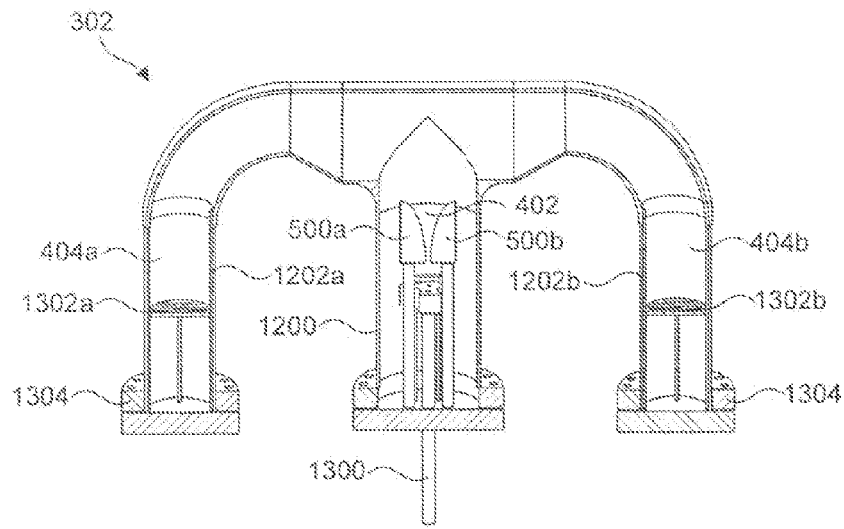
FIG. 13 is a perspective cutaway view of one embodiment of a reformer having the shape illustrated in FIG. 12A.

Referring to FIG. 13, a cutaway perspective view of one embodiment of an M-shaped reformer 302 is illustrated. As shown, the reformer 302 includes a plasma zone 402, located in a center portion 1200 of the reformer 302, and two post-plasma reaction zones 404a, 404b, located in the two branches 1202a, 1202b of the reformer 302. The plasma zone 402 includes a pair of electrodes 500a, 500b having a large potential difference there between. A preheated vapor stream containing a feedstock fuel and an oxidant (e.g., $O_2$, $H_2O$, $CO_2$) may be conveyed through a channel 1300 and directed between the electrodes 500a, 500b. This will ionize the reactants and provide the kinetic energy necessary to initiate the reformation reaction. Where the reformer's outer housing is made of a conductive material, such as steel, the plasma zone 402 may be lined with a non-conductive material, such as an alumina ceramic, to prevent electricity from discharging from the electrodes 500a, 500b through the housing.

Synthesis gas and residual reactants may be conveyed through the M-shaped housing into the reaction zones 404a, 404b, where residual reactants may absorb additional heat of reformation and continue to react to form synthesis gas or other desired reaction products. In these zones 404a, 404b, the reactants may be homogenized by passing them through a pack bed (not shown) of chemical buffering compounds, such as the solid state oxygen storage compound previously mentioned, to promote further reaction. The pack bed may also serve to physically mix and provide additional heat of reformation to the reactants. In selected embodiments, the reactants and the products of the reactants may also be passed over catalysts suitable for promoting equilibration of gas species at temperatures different than the reforming reactions.

In certain embodiments, the pack bed may be placed in perforated metal baskets (not shown) that sit on top of slotted metal grates 1302a, 1302b. Ports (not shown) may be placed immediately beneath the slotted grates 1302a, 1302b to remove the reformed fuel (i.e., the synthesis gas) from the reformer 302 and convey it to a fuel cell 304 or other fuel-consuming device. This allows the reformed fuel to be conveyed from the reformer 302 to the fuel cell 304 in the hot zone as opposed to piping the reformed fuel through a bottom flange 1304 of the reformer 302 and into a low-temperature zone (thereby undesirably cooling the fuel). This also keeps the flange 1304 cooler and makes it easier to change stacks 304 without cutting or welding pipe. In certain embodiments, the regions beneath the grates 1302a, 1302b may be filled with an insulating material to maintain a temperature differential between the low temperature zone and the hot zone.

Figure 14:
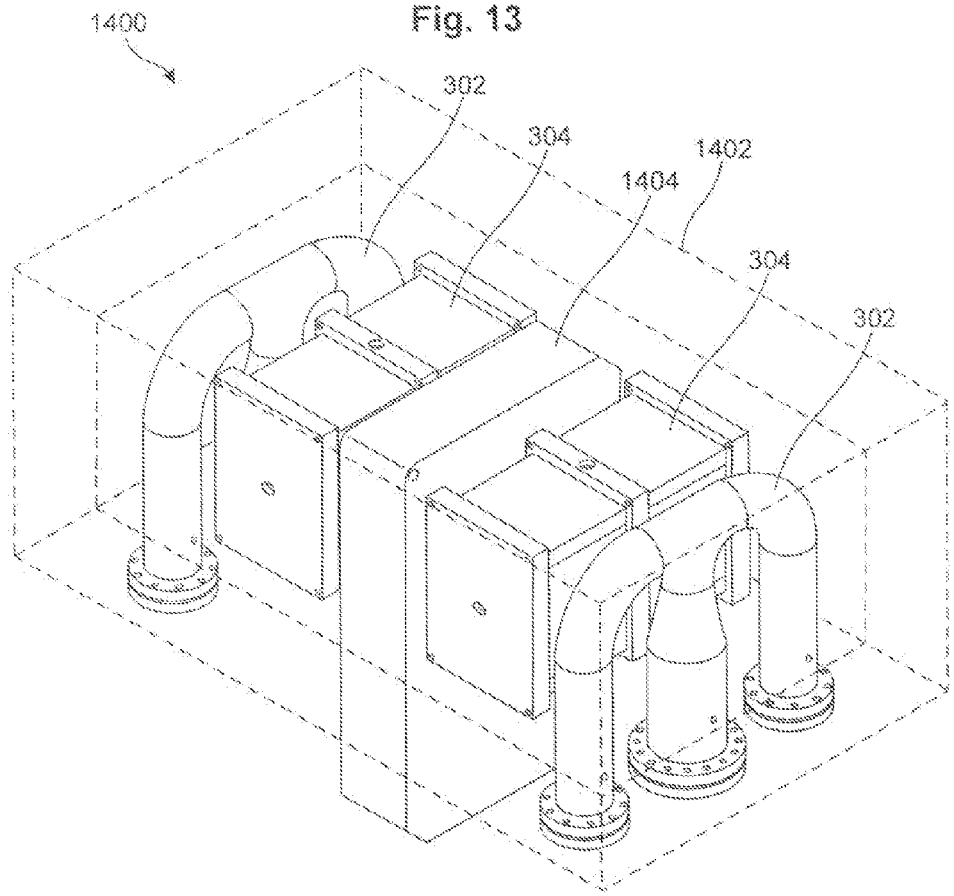
FIG. 14 is a perspective view of one embodiment of a thermally integrated reformer and fuel cell, wherein the reformer has a shape similar to that illustrated in FIG. 13.

Referring to FIG. 14, a perspective view of one embodiment of a thermally integrated system 1400 comprising a pair of reformers 302 and a pair of fuel cells 304 is illustrated. In this embodiment, the reformers 302 and fuel cells 304 are housed inside an insulated enclosure 1402 (the form of which is indicated by the dotted lines) to retain heat within the enclosure 1402 and facilitate heat transfer between the components 302, 304. More specifically, heat generated by the fuel cells 304, which may include heat generated through electrical resistance and electrochemical reactions, may be transferred to the reformers 302 by way of radiation and/or convection. A heat exchanger 1404 may be provided within the enclosure 1402 to transfer heat from exhaust gases (which may include oxygen-depleted air as well as some $CO_2$ and water vapor) exiting the fuel cell stacks 304 to the incoming reactant streams (which may include the feedstock fuel, air, and steam) entering the reformers 302. This may retain heat within the enclosure 1402 to provide additional heat of reformation to the reformers 302, thereby improving efficiency.

In the illustrated embodiment 1400, the reformer 302 is an M-shaped reformer 302, although any of the reformers 302 illustrated in FIGS. 7 through 12D may be used. One notable attribute of the reformers 302 illustrated in FIGS. 12A through 12D is that their elongated aspect ratio makes their integration with the fuel cell stacks 304 more compact. The elongated aspect ratio also facilitates easier connection of the reformers 302 to the fuel cell stacks 304 within the hot zone (i.e., the space inside the enclosure 1402). The elongated aspect ratios further increase surface area and enhance heat transfer into the plasma and reaction zones 402, 404 of the reformers 302.

In one embodiment, an integrated system 1400 such as that illustrated in FIG. 14 may be used to reform JP-10 feedstock fuel using the plasma reformer 302. An electric furnace was used to heat a U shape reformer similar to the embodiment illustrated in FIG. 12B. The reformer operation was proven with repeated 200 hour runs on JP-10. The reformer operated with an exceptionally high fuel equivalence ratio (low $O_2$ addition) $\phi>20$ ($O_2$ was 4.8 percent of stoichiometric). An SOFC single cell embodiment of the present invention showed equivalent performance with both JP-10 reformate and $H_2$. An SOFC stack embodiment of the present invention showed equivalent performance with both JP-10 reformate and $H_2$.

Figure 15:
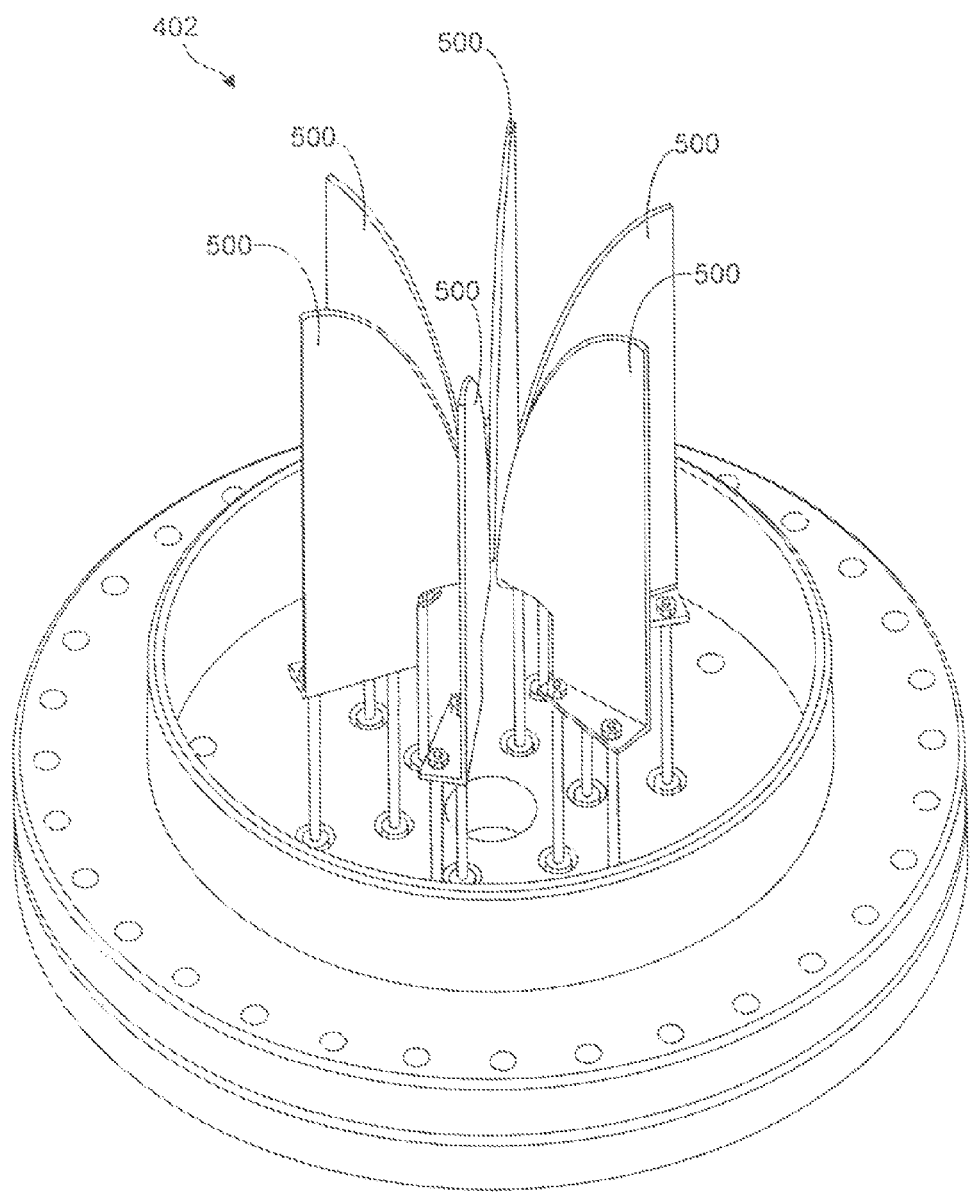
FIG. 15 is a perspective view of an alternative embodiment of the gliding arc plasma generator illustrated in FIGS. 5A through 5C.

Referring to FIG. 15, one alternative embodiment of a plasma generator 402 is illustrated. As shown, the plasma generator 402 includes more electrodes 500 than the pair illustrated in FIGS. 5A through 5C. In certain embodiments, the electrodes 500 may be arranged in a radial pattern although other patterns, such as linear arrays, are also possible. The additional electrodes 500 provide additional arcing and thus additional energy to ionize the reactants and initiate the reformation process. This will allow greater quantities of feedstock fuel to be processed by the plasma generator 402. The illustrated plasma generator 402 may be used in larger reformers 302 or where additional reformer throughput is needed.

The present invention may be embodied in other specific forms without departing from its essence or essential characteristics. The described embodiments are to be considered in all respects only as illustrative, and not restrictive. The scope of the invention is, therefore, indicated by the appended claims, rather than by the foregoing description. All changes within the meaning and range of equivalency of the claims are to be embraced within their scope.

The invention claimed is:

1. A method of forming synthesis gas comprising:
   receiving a pre-heated mixture of reactants, comprising a feedstock fuel and an oxidant, into a plasma zone;
   ionizing the reactants in the plasma zone by applying an electrical potential thereto;
   transferring heat to the ionized reactants through a first thermally conductive surface surrounding the plasma zone;
   receiving the ionized reactants into a reaction zone;
   chemically transforming the ionized reactants in the reaction zone into synthesis gas comprising a mixture of hydrogen and carbon monoxide; and
   transferring heat to the reaction zone through a second thermally conductive surface surrounding the reaction zone, wherein the second thermally conductive surface and the first thermally conductive surface are both directly exposed to a heat source.

2. The method of claim 1, wherein the first thermally conductive surface and the second thermally conductive surface are designed with a surface area sufficient to transfer between about two and thirty percent of the heating value of the feedstock fuel, presently in the plasma and reaction zones, into the plasma and reaction zones to provide the heat of reformation.

3. The method of claim 1, wherein the plasma zone and the reaction zone are incorporated into a housing having a length and width, and wherein the aspect ratio of the length to the width is at least 1:1.

4. The method of claim 3, wherein the aspect ratio of the length to the width is at least 1.5:1.

5. The method of claim 1, wherein the first thermally conductive surface and the second thermally conductive surface are incorporated into one of a U-shaped, M-shaped, and serpentine-shaped housing.

6. The method of claim 1, wherein the feedstock fuel comprises at least one of a hydrocarbon and carbon.

7. The method of claim 1, wherein the oxidant comprises at least one of steam, oxygen, and an oxygen-containing compound.

8. The method of claim 1, wherein the oxidant is provided in sub-stoichiometric amounts to partially oxidize the feedstock fuel.

9. The method of claim 1, wherein the pre-heated mixture of reactants is provided as a vapor.

10. The method of claim 1, wherein the plasma zone uses a gliding electric arc to ionize the reactants.

11. The method of claim 1, wherein the reaction zone comprises a reaction bed to at least one of homogenize the reactants by mixing, and homogenize the reactants by chemical buffering.

12. The method of claim 1, wherein the reaction zone comprises a reaction bed containing catalysts to promote equilibration of reactive species at temperatures lower than the temperature of reformation.

13. The method of claim 1, wherein the external heat source is one of a solid-oxide fuel cell, a molten-carbonate fuel cell, a phosphoric acid fuel cell, and a Fischer-Tropsch process.

14. The method of claim 13, wherein at least one reactant comprises $CO_2$ obtained as a product of the fuel cell reaction.

15. The method of claim 13, wherein at least one reactant comprises steam obtained as a product of the fuel cell reaction.

16. The method of claim 1, wherein the reformer and external heat source are disposed within an insulated enclosure.

17. The method of claim 1, further comprising a heating zone to heat the preheated mixture.

18. A method of forming synthesis gas comprising:
receiving a pre-heated mixture of reactants, comprising a feedstock fuel and an oxidant, into a plasma zone, wherein the feedstock fuel comprises at least one of a hydrocarbon and carbon, and wherein the oxidant comprises at least one of steam, oxygen, and an oxygen-containing compound, and wherein the plasma zone uses a gliding electric arc to ionize the reactants;
ionizing the reactants in the plasma zone by applying an electrical potential thereto;
transferring heat to the ionized reactants through a first thermally conductive surface surrounding the plasma zone;
receiving the ionized reactants into a reaction zone, wherein the reaction zone comprises a reaction bed to at least one of homogenize the reactants by mixing, and homogenize the reactants by chemical buffering;
chemically transforming the ionized reactants in the reaction zone into synthesis gas comprising a mixture of hydrogen and carbon monoxide; and
transferring heat to the reaction zone through a second thermally conductive surface surrounding the reaction zone, wherein the second thermally conductive surface and the first thermally conductive surface are both directly exposed to a heat source.

19. A method of forming synthesis gas comprising:
receiving a pre-heated mixture of reactants, comprising a feedstock fuel and an oxidant, into a plasma zone, wherein the feedstock fuel comprises at least one of a hydrocarbon and carbon, and wherein the oxidant comprises at least one of steam, oxygen, and an oxygen-containing compound, and wherein the plasma zone uses a gliding electric arc to ionize the reactants;
ionizing the reactants in the plasma zone by applying an electrical potential thereto;
transferring heat to the ionized reactants through a first thermally conductive surface surrounding the plasma zone;
receiving the ionized reactants into a reaction zone;
chemically transforming the ionized reactants in the reaction zone into synthesis gas comprising a mixture of hydrogen and carbon monoxide; and
transferring heat to the reaction zone through a second thermally conductive surface surrounding the reaction zone, wherein the second thermally conductive surface and the first thermally conductive surface are both directly exposed to a heat source.

* * * * *